(12) United States Patent
Rappoport et al.

(10) Patent No.: US 9,594,807 B2
(45) Date of Patent: Mar. 14, 2017

(54) EMOTION-RELATED QUERY PROCESSING

(71) Applicants: Rinat Rappoport, Haifa (IL); Raanan Yehezkel, Kiryat Ekron (IL); Roman Fishtein, Haifa (IL); Sergei Goffman, Haifa (IL); Guy Jacob, Netanya (IL); Oren Gershon, Atlit (IL); Andrey Sloutsman, Nesher (IL); Ido Lapidot, Haifa (IL); Ofer Givoli, Haifa (IL)

(72) Inventors: Rinat Rappoport, Haifa (IL); Raanan Yehezkel, Kiryat Ekron (IL); Roman Fishtein, Haifa (IL); Sergei Goffman, Haifa (IL); Guy Jacob, Netanya (IL); Oren Gershon, Atlit (IL); Andrey Sloutsman, Nesher (IL); Ido Lapidot, Haifa (IL); Ofer Givoli, Haifa (IL)

(73) Assignee: Intel Corporation, Santa Clara, CA (US)

( * ) Notice: Subject to any disclaimer, the term of this patent is extended or adjusted under 35 U.S.C. 154(b) by 29 days.

(21) Appl. No.: 14/127,951

(22) PCT Filed: Aug. 6, 2013

(86) PCT No.: PCT/US2013/053804
§ 371 (c)(1),
(2) Date: Dec. 19, 2013

(87) PCT Pub. No.: WO2015/020638
PCT Pub. Date: Feb. 12, 2015

(65) Prior Publication Data
US 2015/0193507 A1    Jul. 9, 2015

(51) Int. Cl.
*G06K 9/00* (2006.01)
*G06F 17/30* (2006.01)
*G06Q 10/10* (2012.01)

(52) U.S. Cl.
CPC ... *G06F 17/30528* (2013.01); *G06K 9/00302* (2013.01); *G06Q 10/101* (2013.01); *G06T 2207/30201* (2013.01)

(58) Field of Classification Search
CPC .................................................. G06F 2203/011
See application file for complete search history.

(56) References Cited

U.S. PATENT DOCUMENTS 5,930,804 A * 7/1999 Yu et al.
2003/0039380 A1* 2/2003 Sukegawa et al. ........... 382/118
(Continued)

FOREIGN PATENT DOCUMENTS

| KR | 10-2010-009263 A | 8/2010 |
| KR | 10-2012-006938 A | 6/2012 |

OTHER PUBLICATIONS

Sharon Profis, DYI:A dead-simple workout armband, CNET Mar. 26, 2012.*

(Continued)

*Primary Examiner* — Mark Roz
(74) *Attorney, Agent, or Firm* — Schwabe, Williamson & Wyatt, P.C.

(57) ABSTRACT

Embodiments of techniques, apparatuses and systems associated with emotion information processing are disclosed. In some embodiments, a computing system may receive an image of a person and identify an emotional state of the person, based at least in part on the image. The computing system may cause storage of the emotional state of the person in combination with other data to enable subsequent response to an emotion-related query provided to the computing system. The emotion-related query may include an emotion-related criteria and a non-emotion-related criteria and the response may be based at least in part on the emotional state in combination with at least some of the (Continued)

other data. Other embodiments may be described and/or claimed.

23 Claims, 4 Drawing Sheets

(56) References Cited

U.S. PATENT DOCUMENTS

| 2004/0101178 A1* | 5/2004 | Fedorovskaya ....... G06F 19/321 |
| | | 382/128 |
| 2011/0040155 A1 | 2/2011 | Guzak et al. |
| 2012/0124456 A1 | 5/2012 | Perez et al. |
| 2013/0144937 A1* | 6/2013 | Lee .............................. 709/203 |

OTHER PUBLICATIONS

International Search Report and Written Opinion mailed May 27, 2014 for International Application No. PCT/US2013/053804, 12 pages.

International Preliminary Report on Patentability mailed Feb. 18, 2016 for International Application No. PCT/US2013/053804, 9 pages.

Michael Rubinstein et al., "Unsupervised Joint Object Discovery and Segmentation in Internet Images", Jun. 23-28, 2013, 1 page, Computer Vision and Pattern Recognition (CVPR), 2013 IEEE Conference, Portland, Oregon, retrieved on Aug. 17, 2016, http://ieeexplore.ieee.org/xpl/login.jsp?tp=&arnumber=6619097&url=http%3A%2F%2Fieeexplore.ieee.org%2Fxpls%2Fabs_all.jsp%3Farnumber%3D6619097.

Lefei Zhang et al., "A method for object identification in multispectral image based on tensor approach", Jun. 4-7, 2012, 1 page, 2012 4th Workshop on Hyperspectral Image and Signal Processing: Evolution in Remote Sensing (Whispers), Shanghai, China, retrieved on Aug. 17, 2016, http://ieeexplore.ieee.org/xpl/articleDetails.jsp?arnumber=6874268&queryText=.QT.object%20identification.QT.&ranges=2012_2013_Year.

Mashape Masher, of the Mashape Blog, "List of 14+ Image Recognition APIs Posted on Oct. 10, 2013", 4 pages, retrieved on Aug. 17, 2016, https://web.archive.org/web/20140707084311/http://blog.mashape.com/listof14imagerecognitionapis.

Mohammad Osiur Rahman et al., "Object identification using DNA computing algorithm", Jun. 10-15, 2012, 2 pages, 2012 IEEE Congress on Evolutionary Computation, Brisbane, QLD, retrieved on Aug. 17, 2016, http://ieeexplore.ieee.org/xpl/articleDetails.jsp?arnumber=6256526&queryText=.QT.object%20identification.QT.&refinements=4291944246&refinements=undefi%E2%80%A6.

* cited by examiner

| TIMESTAMP | LOCATION | USER | # SPEAKERS DETECTED | SPEAKERS IDENTIFIED | # FACES DETECTED | FACES IDENTIFIED | CONTEXT | EMOTIONAL STATE |
|---|---|---|---|---|---|---|---|---|
| 2012-10-30 TU 11:45 EST | 42.28:-71.03 | ABC | 1 | Alice | 2 | Alice, Bob | Restaurant | Alice(Happy), Bob(Surprised) |
| 2012-11-04 SU 15:24 EST | 42.37:-71.11 | ABC | 1 | Alice | 1 | Alice | Street | Alice(Content) |

| FACE IDENTIFIED | TIMESTAMP | LOCATION | USER | CONTEXT | EMOTIONAL STATE | OTHER SPEAKERS IDENTIFIED | OTHER FACES IDENTIFIED |
|---|---|---|---|---|---|---|---|
| Alice | 2012-10-30 TU 11:45 EST | 42.28:-71.03 | ABC | Restaurant | Happy | -- | Bob |
| Alice | 2012-11-04 SU 15:24 EST | 42.37:-71.11 | ABC | Street | Content | -- | -- |
| Bob | 2012-10-30 TU 11:45 EST | 42.28:-71.03 | ABC | Restaurant | Surprised | Alice | Alice |

EMOTION-RELATED QUERY PROCESSING

CROSS REFERENCE TO RELATED APPLICATION

The present application is a national phase entry under 35 U.S.C. §371 of International Application No. PCT/US2013/053804, filed Aug. 6, 2013, entitled "EMOTION-RELATED QUERY PROCESSING," which designated, among the various States, the United States of America, and which is hereby incorporated by reference.

TECHNICAL FIELD

The present disclosure relates generally to the field of information processing, and more particularly, to emotion-related query processing.

BACKGROUND

It is not uncommon for an individual to have hundreds of digital photographs and video stored on one or more personal computing devices (e.g., a smartphone or a digital camera). Organizing and archiving these media files may be a prohibitively tedious and intensive process, and therefore the bulk of the information in these media files may be effectively inaccessible to the individual. Services that allow an individual to annotate photographs (e.g., with the names of the people depicted in the photograph) typically require extensive manual curation, and even after annotation, are limited in the information readily accessible to the individual.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Embodiments of techniques, apparatuses and systems associated with emotion information processing are disclosed. Some embodiments may be associated with emotion-related query processing. For example, in some embodiments, a computing system may receive an image of a person and identify an emotional state of the person, based at least in part on the image. The computing system may cause storage of the emotional state of the person in combination with other data to enable subsequent response to an emotion-related query provided to the computing system. The emotion-related query may include an emotion-related criteria and a non-emotion-related criteria and the response may be based at least in part on the emotional state in combination with at least some of the other data. Thus, some embodiments may allow outward facing image capture devices, like a camera included in a wearable computing device, to capture images of the people with whom the wearer interacts, analyze the images (e.g., for emotion-related information) and store the results of the analysis stored for future reference and search.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description uses the phrases "in an embodiment," or "in embodiments," which may each refer to one or more of the same or different embodiments. Furthermore, the terms "comprising," "including," "having," and the like, as used with respect to embodiments of the present disclosure, are synonymous. As used herein, the term "logic" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
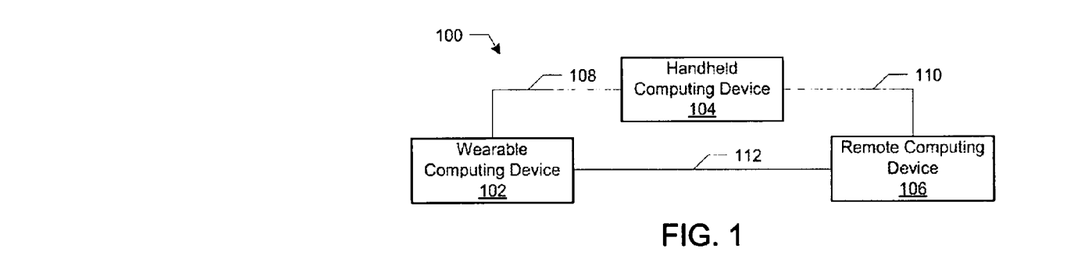
FIG. 1 is a block diagram of an illustrative computing system configured for emotion information processing, in accordance with various embodiments.

FIG. 1 depicts an illustrative computing system 100 configured for emotion information processing, in accordance with various embodiments. In some embodiments, the computing system 100 may be configured to receive an image, determine an emotional state of a person in the image, and cause the storage of the emotional state of the person in combination with other data to enable subsequent response to an emotion-related query provided to the computing system 100. Examples of emotion-related queries to which the computing system 100 may respond may include "When did I last see John angry?" "On average, was Mandy happy to see me this month?" and "Is my boss relatively angry when I meet him in the morning?" Emotion information processing operations may be distributed between various components of the computing system 100 as suitable. Several examples of the distribution of operations between the components of the computing system 100 are discussed herein, but any other combination of more or less components and distribution of the operations may be used. In some embodiments, the computing system 100 may be configured as the emotion information processing system 200, discussed below with reference to FIG. 2.

The computing system 100 may include a wearable computing device 102, a handheld computing device 104, and a remote computing device 106. Communication between the components of the computing system 100 may be enabled by the communication pathways 108, 110 and 112. The communication pathways 108, 110 and 112 may each include wired communication pathways and/or wireless communication pathways, over direct couplings, and/or over personal, local and/or wide area networks. Each of the wearable computing device 102, the handheld computing device 104 and the remote computing device 106 may include suitable hardware for supporting the communication pathways 108, 110 and 112, such as network interface cards, modems, WiFi devices, Bluetooth devices, and so forth. In some embodiments, the communication pathways 108, 110 and 112 may be direct communication pathways between the components as illustrated in FIG. 1. As used herein, references to "direct" communication pathways between two components of the computing system 100 of FIG. 1 (or any system or device disclosed herein) may refer to a communication pathway that does not route through another illustrated component, but that may route through other non-illustrated devices (e.g., routers and/or switches).

Each of the computing devices included in the computing system 100 may include a processing device and a storage device (not shown). The processing device may include one or more processing devices, such as one or more processing cores, ASICs, electronic circuits, processors (shared, dedicated, or group), combinational logic circuits, and/or other suitable components that may be configured to process electronic data. The storage device may include any suitable memory or mass storage devices (such as solid-state drive, diskette, hard drive, compact disc read only memory (CD-ROM) and so forth). Each of the computing devices included in the computing system 100 may include one or more buses (and bus bridges, if suitable) to communicatively couple the processing device, the storage device, and any other devices including in the respective computing devices. The storage device may include a set of computational logic, which may include one or more copies of computer readable media having instructions stored therein which, when executed by the processing device of the computing device, may cause the computing device to implement any of the techniques and methods disclosed herein, or any portion thereof. In some embodiments, the computational logic may include any of the logic discussed below with reference to FIG. 2.

The wearable computing device 102 may be a computing device that is integrated into a garment, accessory or other support structure that is configured to be worn on the body of the user (or "wearer"). Examples of suitable support structures for the wearable computing device 102 may include glasses, a headset, a hair accessory (e.g., a headband or barrette), an ear piece, jewelry (e.g., brooch, earrings or a necklace), a wrist band (e.g., a wristwatch), a neck band (e.g., a tie or scarf), a garment (e.g., a shirt, pants, dress skirt or jacket), a heat, shoes, a lanyard or nametag, a contact lens, or an implantable support structure, among others. In some embodiments, the wearable computing device 102 may be a wrist-mounted computing device having a camera and microphone. In some embodiments, the wearable computing device 102 may be a glasses-mounted computing device having a camera and microphone. In some embodiments, the wearable computing device 102 may include a "world-facing" camera (i.e., a camera directed away from the wearer) and a microphone.

The handheld computing device 104 may be a computing device configured for carrying in a pocket, backpack or other carrying case, and for operation with one or more of a user's hands. Examples of handheld computing devices that may serve as the handheld computing device 104 include cellular phones, smartphones, other handheld mobile communication devices, tablets, electronic book readers, personal digital assistants, laptops, or other such computing devices. Emotion processing and other operations performed by the handheld computing device 104 may be controlled by an app or plug-in on the handheld computing device 104, for example. In some embodiments, the handheld computing device 104 may have more computing resources (e.g., processing power, memory, and/or communication bandwidth) than the wearable computing device 102. Thus, in some embodiments, data captured and preliminarily processed by the wearable computing device 102 (e.g., image, audio, or other sensor data) may be transmitted over the communication pathway 108 to the handheld computing device 104 for further processing.

The remote computing device 106 may include one or more servers (e.g., arranged in a "cloud" computing configuration) or other computing devices remote from the wearable computing device 102 and the handheld computing device 104. The communication pathway 112 between the wearable computing device 102 and the remote computing device 106, and communication pathway 110 between the handheld computing device 104 and the remote computing device 106, may be configured according to any remote wired or wireless communication protocol. In some embodiments, the remote computing device 106 may have more computing resources (e.g., processing power, memory, and/or communication bandwidth) than the wearable computing device 102 or the handheld computing device 104. Thus, in some embodiments, data captured and preliminarily processed by the wearable computing device 102 and/or the handheld computing device 104 (e.g., image, audio, or other sensor data) may be transmitted over the communication pathways 110 and/or 112 to the remote computing device 106 for further processing. In some embodiments, the remote computing device 106 may perform most of the emotion-related operations discussed below with reference to FIG. 2, including those performed by the data processing logic 202 and/or the emotion identification logic 218. In some embodiments, the remote computing device 106 may include a memory storing emotional state information that may be accessed when the computing system 100 receives an emotion-related query.

In some embodiments, the remote computing device 106 may communicate with a plurality of handheld computing devices (configured similarly to the handheld computing device 104) and/or a plurality of wearable computing devices (configured similarly to the wearable computing device 102). The remote computing device 106 may perform similar processing and storage operations for each handheld or wearable computing device. For example, the remote computing device 106 may receive images captured by image capture devices included in a plurality of wearable computing devices (configured similarly to the wearable computing device 102) and may perform emotion information processing on these images (e.g., identifying emotional states of people in the images). The remote computing device 106 may devote different resources to different ones of the plurality of handheld or wearable computing devices in communication with the remote computing device (e.g., different memory partitions or databases for each device).

In some embodiments of the emotion information processing systems disclosed herein, one or more of the components of the computing system 100 shown in FIG. 1 may not be included. For example, in some embodiments, the computing system 100 may not include a handheld computing device 104. In some embodiments, one or more of the communication pathways between components of the computing system 100 may not be included; for example, in some embodiments, the wearable computing device 102 may not communicate directly with the remote computing device 106 via the communication pathway 112 (but may communicate with the remote computing device 106 via the handheld computing device 104 and the communication pathways 108 and 110). In some embodiments, both computing devices 102 and 104 may be wearable, or both computing devices 102 and 104 may be handheld.

Figure 2:
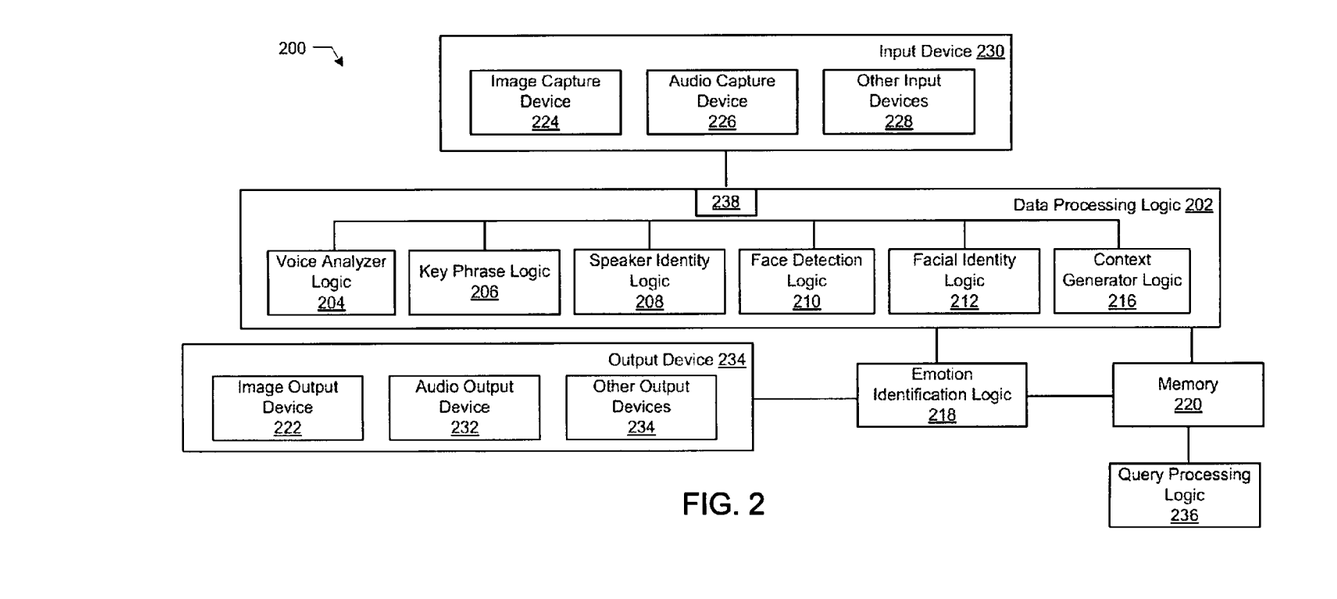
FIG. 2 is a block diagram of an illustrative emotion information processing system that may be implemented by the computing system of FIG. 1, in accordance with various embodiments.

FIG. 2 depicts an illustrative emotion information processing system 200. As discussed above with reference to the computing system 100, the emotion information processing system 200 may be configured to perform any of a number of emotion information processing operations. For example, the emotion information processing system 200 may be configured to receive an image, determine an emotional state of a person in the image, and cause the storage of the emotional state of the person in combination with other data to enable subsequent response to an emotion-related query. The emotion information processing system 200 may be implemented by the computing system 100 of FIG. 1, in accordance with various embodiments. In particular, the components of the emotion information processing system 200 may be distributed in any suitable manner among one or more of the components of the computing system 100. Although a number of components are illustrated in FIG. 2, various embodiments may omit components as appropriate for the emotion information processing operations to be performed. For example, some embodiments of the emotion information processing system 200 may not be configured for audio information processing, and thus may not include one or more of the audio capture device 226, the voice analyzer logic 204, the key phrase logic 206, or the speaker identity logic 208.

The emotion information processing system 200 may include an input device 230. The input device 230 may include an image capture device 224, an audio capture device 226, and other input devices 228. Although the input device 230 (and other components described herein) may be referred to in the singular, any number of input devices may be included in the input device 230 (and similarly, any component may include multiple such components). In some embodiments, the input device 230 may include a single input device (e.g., a single camera).

In some embodiments, the image capture device 224 may include one or more digital cameras, for example, and may use any imaging wavelength (e.g., visible or infrared light). As used herein, the term "camera" may include still image cameras and video cameras. In some embodiments, the image capture device 224 may capture high-definition video. In some embodiments, the image capture device 224 may be configured to stream image data (e.g., video data) to other devices via a wired or wireless communication pathway. For example, the image capture device 224 may be included in the wearable computing device 102 (FIG. 1), and may stream image data wirelessly to the handheld computing device 104 via the communication pathway 108. In some embodiments, the image capture device 224 may include a visible light camera and an infrared camera, and may combine the images captured by these devices or treat them separately. In some embodiments, the image capture device 224 may include two or more cameras having different orientations (e.g., one camera that is mounted on the wearable computing device 102 and faces away from the user in a "world-facing" orientation, and one camera that is mounted on the handheld computing device 104 and faces toward the user when the handheld computing device 104 is in use).

The audio capture device 226 may include one or more microphones. In some embodiments, the audio capture device 226 may include multiple microphones with different orientations, which may allow the emotion information processing system 200 to locate various speakers and correlate those locations with people identified in an image captured by the image capture device 224. Examples of the other input devices 228 may include a keyboard, a cursor control device such as a mouse, a stylus, a touchpad, a bar code reader, a Quick Response (QR) code reader, an radio frequency identification (RFID) reader, a Global Positioning System (GPS) receiver, a short-range wireless receiver (e.g., a Bluetooth receiver), one or more sensors (e.g., an accelerometer or a motion detector), or any other suitable input device.

The emotion information processing system 200 may include data processing logic 202. The data processing logic 202 may include an input device interface 238 configured to receive data from the input device 230, and logic components configured to analyze information provided by the input device 230 and output the results of the analysis to one or more additional components of the emotion information processing system 200, including the emotion identification logic 218. Although the components of the data processing logic 202 are illustrated separately, the components may be combined or divided as suitable, and each may use one or more of the results generated by others in performing its own analysis. Data may be communicated between the components of the data processing logic 202 over a physical bus, a long-distance wired communication pathway, a short- or long-distance wireless communication pathway, or any combination of communication pathways.

The data processing logic 202 may include voice analyzer logic 204. The voice analyzer logic 204 may perform one or more audio processing techniques on audio data received from the audio capture device 226 to determine one or more voice-related features of the audio data. In some embodiments, the voice analyzer logic 204 may detect whether the audio data includes a voice and/or how many voices are represented in the audio data (e.g., by using a trained classifier). In some embodiments, the voice analyzer logic 204 may determine a voice signature for each voice detected in the audio data. A voice signature may include, for example, an audio frequency profile or other data representative of the detected voice. In some embodiments, the voice analyzer logic 204 may perform speech recognition on one or more of the voices represented in the audio data, and may provide, as an output, a text representation of the spoken words.

The data processing logic 202 may include key phrase logic 206. The key phrase logic 206 may detect one or more key phrases in audio data provided by the audio capture device 226 and/or in a processed representation of audio data provided by the voice analyzer logic 204 (e.g., a text representation of spoken words). A key phrase may be a phrase that often accompanies information useful for identifying a person (e.g., a phrase that often accompanies a person's name). Examples of key phrases may include "Nice to meet you, I'm [name]" and "My name is [name]." The key phrase logic 206 may be configured to determine an identifier of the person (e.g., the "[name]" in the above examples) based on the detected key phrase. In some embodiments, a key phrase, detected by the key phrase logic 206 as spoken by a first person, may be useful for identifying a second person (e.g., "This is my friend, [name]"). In such embodiments, the key phrase logic 206 may be configured to extract the "[name]" from the key phrase or audio/text information near the key phrase, and associate the "[name]" determined from the key phrase with the appropriate voice in the audio data or the appropriate person in an image (e.g., by using one or more microphones arranged to identify a direction of each voice and/or by correlating audio data with image data to match speakers detected in audio data with people detected in image data). The output of the key phrase logic 206 may be an identifier (e.g., a name) of a speaker detected in audio data or a person detected in image data.

The data processing logic 202 may include speaker identity logic 208. The speaker identity logic 208 may be configured to identify one or more speakers whose voices are represented in audio data provided by the audio capture device 226 and/or in a processed representation of audio data provided by the voice analyzer logic 204 (e.g., a text representation of spoken words or a voice signature). For example, the speaker identity logic 208 may include a trained classifier configured to identify a voice signature (or receive such a signature from the voice analyzer logic 204) and output an identifier (e.g., a name) of a speaker detected in audio data. The speaker identity logic 208 may also be configured to output an indicator that the person could not be identified based on the voice signature when the speaker identity logic 208 is unable to identify the person within a desired confidence level.

The data processing logic 202 may include face detection logic 210. The face detection logic 210 may perform one or more image processing techniques on image data received from the image capture device 224 to determine whether the image data includes a face and/or how many faces are represented in the image data (e.g., by using a trained classifier). In some embodiments, the face detection logic 210 may perform face tracking operations to track the movement of a face through different frames of a video stream. In some embodiments, the face detection logic 210 may determine a facial signature for each face detected in the image data. A facial signature may include, for example, the relative positions of various facial features (e.g., corners of eyes, tip of nose, shape of mouth) that may identify a person. The face detection logic 210 may output the detected face information (including face tracking information, if available).

The data processing logic 202 may include facial identity logic 212. The facial identity logic 212 may be configured to receive a facial signature of a person (the facial signature output from the face detection logic 210 or determined by the facial identity logic 212) and output an identifier of the person based on the facial signature. The facial identity logic 212 may also be configured to output an indicator that the person could not be identified based on the facial signature when the facial identity logic 212 is unable to identify the person within a desired confidence level.

The data processing logic 202 may include context generator logic 216. The context generator logic 216 may process data provided by the input device 230 (e.g., image or audio data) to mine for information about the context in which the data from the input device 230 is received. For example, the context generator logic 216 may identify one or more objects in an image from the image capture device 224 (e.g., a Ferris wheel, signifying that the context includes an amusement park), one or more sounds in audio data from the audio capture device 226 (e.g., a foghorn, signifying that the context includes a location near the sea), or a measurement from a sensor included in the other input devices 228 (e.g., temperature and humidity measurements, signifying that the context includes a particular time of year). In some embodiments, the context generator logic 216 may identify other objects of interest to the user, such as the user's keys, wallet, car in a parking lot, or medicine bottles. In some embodiments, the context generator logic 216 may include text recognition logic (not shown) for recognizing text characters that may be included in stored context information. The context generator logic 216 may use the outputs of any of the other components of the data processing logic 202, or data received from any devices included in the input device 230, in determining a context. For example, the context generator logic 216 may use GPS coordinates from a GPS receiver included in the other input devices 228, audio data representing squeaking shoes from the audio capture device 226, and the detection of many voices from the voice analyzer logic 204 to determine that the context is likely a basketball game at a stadium.

The emotion information processing system 200 may include emotion identification logic 218. The emotion identification logic 218 may be configured to receive, as inputs, one or more outputs from the input device 230 and/or the data processing logic 202 and output an emotional state of a detected person based on the inputs. A detected person may be a person detected by the use of the image capture device 224, the audio capture device 226, the other input devices 228, or some combination of devices. In some embodiments, an emotional state output from emotion identification logic 218 may be fed back to the data processing logic 202 and used by one or more components of the data processing logic 202. In some embodiments, one or more of the components of the data processing logic 202 may operate in parallel, series, or any combination with the emotion identification logic 218, The emotion identification logic 218 may be included in the wearable computing device 102, the handheld computing device 104, the remote computing device 106, or distributed among one or more of these devices. Various embodiments of the emotion identification logic 218 are discussed below with reference to FIG. 5. In some embodiments, the identified emotional state may be provided for storage in the memory 220. In some embodiments, the identified emotional state may be stored in the memory 220 in combination with other data to enable subsequent response to an emotion-related query provided to the emotion information processing system 200. The other data may include, for example, an identifier of the person, a time at which an image or audio of the person was captured, or a location at which an image or audio of a person was captured. Additional examples of other data that may be stored in combination with an emotional state in the memory 220 are discussed below with reference to FIGS. 3 and 4.

The emotion information processing system 200 may include an output device 234. As discussed above with reference to the input device 230, although the output device 234 may be referred to in the singular, any number of output devices may be included in the output device 234. In some embodiments, the output device 234 may include a single output device (e.g., a single display). In some embodiments, the output device 234 may include an image output device 222, an audio output device 232, and other output devices 234. The image output device 222 may include one or more heads-up displays (i.e., displays including a projector arranged in an optical collimator configuration and a combiner to provide data without requiring a user to look away from his or her typical viewpoint), computer monitors, projectors, touchscreen displays, liquid crystal displays (LCDs), light-emitting diode displays or flat panel displays, for example. The audio output device 232 may include one or more speakers or other audio transducers which may be, for example, mounted in one or more earphones or earbuds. Examples of the other output devices 234 may include one or more printers, projectors, wired or wireless transmitters for providing information to other devices, additional storage devices, or any suitable output device.

The emotion information processing system 200 may include a memory 220. In some embodiments, the memory 220 may include a database or other data storage structure which may include memory structures (such as the memory structures 300 and 400 discussed below with reference to FIGS. 3 and 4, respectively) for storing emotional state and other data. The memory 220 may include any memory device, such as one or more hard drives, solid state logic, or portable storage media, for example.

The emotion information processing system 200 may include query processing logic 236. The query processing logic 236 may receive a query from a user of the emotion information processing system 200 from the input device 230 (e.g., a spoken word query received through the audio capture device 226, or a text query received through a keyboard or touchpad included in the other input devices 228) through the input device interface 238. The query may be a natural language query, or a structured query (e.g., a Boolean query) and may be processed using known natural language processing or other data parsing techniques for search. The query processing logic 236, upon receiving a query, may apply the query (as processed) to the information stored in the memory 220. As discussed above, that information may include emotional state information and other data stored in combination with the emotional state information. The query may be, for example, an emotion-related query. Examples of emotion-related queries may include "When was Mike last happy to see me?" "Was Rachel tense during our last conversation?" "Is David usually excited while riding a bicycle?" and "Was my boss angry with me after the meeting?" In some embodiments, an emotion-related query may include an emotion-related criteria (e.g., "happy," "tense," "excited") and a non-emotion-related criteria (e.g., an identifier of a person, such as "my boss"; a location, a time, such as "our last conversation" or "after the meeting"; or an object, such as "a bicycle"). The query processing logic 236 may be configured to return a response to the query based on the information stored in the memory 220. The response may be based at least in part on the emotional state in combination with at least some other data stored in the memory 220 (e.g., an identifier of a person, a location, a time, or an object).

An emotion-related query need not be limited to a query about a particular person. The emotion information processing system 200 may aggregate emotion-related information from one or more people based on time, location, or other information. For example, the emotion information processing system 200 may respond to queries such as "What is the overall mood of the people at this party?" "How enthusiastic are the people visiting this tourist site?" or "Have my students become bored over the course of the semester?" by finding the average, median, mode, trend, or other aggregate statistic regarding the emotional states of multiple people (over time or at a single time).

Figures 3, 4:
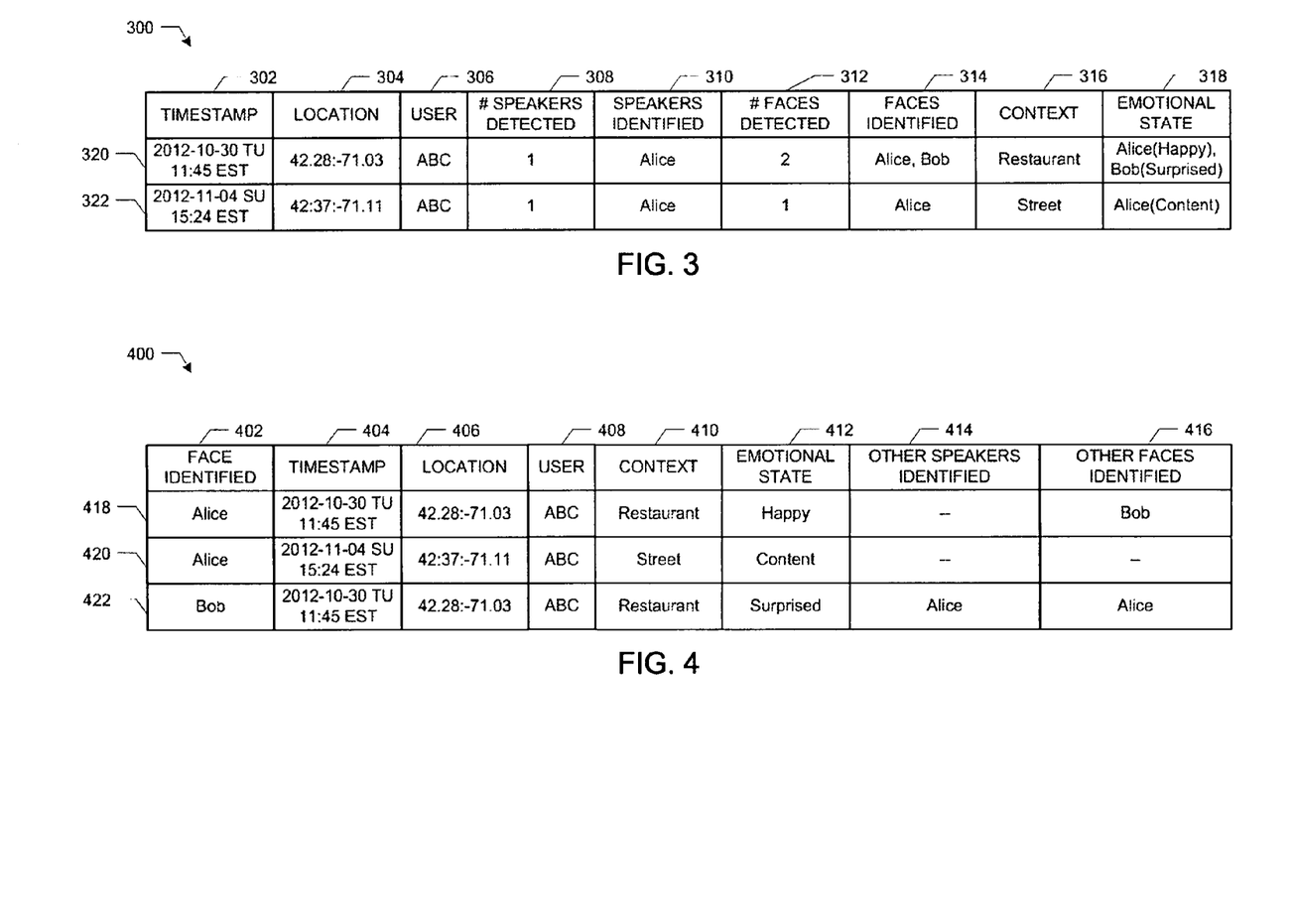
FIGS. 3 and 4 depict illustrative memory structures for storing emotional state and other data to enable the emotion information processing system of FIG. 2 to respond to an emotion-related query, in accordance with various embodiments.

In addition to emotion-related queries, the query processing logic 236 may be configured to respond to other queries using the information stored in the memory 220. For example, the query processing logic 236 may be configured to respond to a question like "Who am I talking to?" or "What did my wife say to me at 2 PM?" with reference to the output of the facial identity logic 212, the voice analyzer logic 204, and/or the key phrase logic 206. The query processing logic 236 may be configured to respond to a question like "Where are my keys?" "When did I last take my medicine?" or "What do I need to buy at the store?" by searching context information (e.g., indicators that keys or a medicine bottle or a grocery list were detected in an image, as stored in the context data fields 316 and 410 of the memory structures 300 and 400, respectively). The processing of queries and search based on queries may be performed using techniques known in the art, and are thus not discussed further herein.

The components of the emotion information processing system 200 may be distributed in any suitable combination between one or more of the components of the computing system 100 of FIG. 1. For example, the image capture device 224 and/or the audio capture device 226 may be included in the wearable computing device 102, and the data processing logic 202 and the emotion identification logic 218 may be distributed between the handheld computing device 104 and the remote computing device 106. In some embodiments, the image capture device 224 may be included in the wearable computing device 102 and the emotion identification logic 218 may be included in the handheld computing device 104, the remote computing device 106, or distributed between the two.

FIGS. 3 and 4 depict illustrative memory structures 300 and 400, respectively, for storing emotional state and other data in the memory 220 to enable subsequent response to an emotion-related query, in accordance with various embodiments. As discussed above, the memory 220 may include a database or other data storage structure which may include memory structures (such as the memory structures 300 and 400) for storing emotional state and other data. The memory structures 300 and 400 are illustrative examples of possible memory structures, and any memory structure containing information to enable response to an emotion-related query may be used.

The memory structure 300 may be principally indexed by image, and may include a number of data fields. The memory structure 300 may include a timestamp field 302, which may store a timestamp including time, day, time zone and other information about the time at which an image was captured by the image capture device 224 and may uniquely identify the image. The memory structure 300 may include a location field 304, which may store GPS coordinates, latitude and longitude, a city or place name, or other information about a location at which an image was captured by the image capture device 224. The memory structure 300 may include a user field 306, which may store an identifier of the user associated with the image capture device 224.

When the memory 220 is included in the remote computing device 106, and the remote computing device 106 is configured to store information about images captured by a plurality of image capture devices associated with different users, the user field 306 or a similar field may be used to distinguish between images captured by different users.

The memory structure 300 may include a "number of speakers detected" field 308, which may store information about the number of speakers detected (e.g., by the voice analyzer logic 204 and/or the speaker identity logic 208) in audio data captured by the audio capture device 226 prior to, including, or after a time at which the image was captured. The memory structure 300 may include a "speakers identified" field 310, which may store information about the identities of speakers detected (e.g., by the speaker identity logic 208) in audio data captured by the audio capture device 226 prior to, including, or after a time at which the image was captured.

The memory structure 300 may include a "number of faces detected" field 312, which may store information about the number of faces detected (e.g., by the face detection logic 210 and/or the facial identity logic 212) in the image. The memory structure 300 may include a "faces identified" field 314, which may store information about the identities of faces detected in the image (e.g., as output by the facial identity logic 212). The memory structure 300 may include a context field 316, which may store information about a context of the image (e.g., as determined by the context generator logic 216). The memory structure 300 may include an "emotional state" field 318, which may store the emotional state of the people detected in the image (e.g., as output by the emotion identification logic 218). Two example entries 320 and 322 are depicted for illustrative purposes. The data fields illustrated in FIG. 3 are illustrative, and any one or more data field may be omitted and/or additional data fields may be included.

The memory structure 400 represents a different structure for organizing emotion-related information than the memory structure 300. In particular, the memory structure 400 may be principally indexed by the identity of persons detected in images. Many of the data fields included in the memory structure 400, such as the timestamp field 404, the location field 406, the user field 408 and the context field 410, may contain the same information as the counterpart fields in the memory structure 300, discussed above. Other fields included in the memory structure 400 may organize the some or all of the remaining information included in the memory structure 300 in different ways. In some embodiments, the memory structure 300 may include a "face identified" field 402, which may store an identifier (e.g., a name) of a person detected in an image. If multiple people are detected in an image, multiple entries may be included for that in the memory structure 400, each principally indexed by the identifier of a person in the image. In some embodiments, the memory structure 300 may include an "emotional state" field 412, which may store the emotional state of the person in the image indexed by the timestamp field 404 (identified in the field 402) as determined by, e.g., the emotion identification logic 218. In some embodiments, the memory structure 300 may include an "other speakers identified" field 414, which may store identifiers of other people identified (e.g., by the speaker identity logic 208) in the image indexed by the timestamp field 404, apart from the person identified in the "face identified" field 402. In some embodiments, the memory structure 300 may include an "other faces identified" field 416, which may store identifiers of other people identified (e.g., by the facial identity logic 212) in the image indexed by the timestamp field 404, apart from the person identified in the "face identified" field 402. Three example entries 418, 420 and 422 are depicted for illustrative purposes; these entries use the same information used to populate the entries 320 and 322 in the memory structure 300 of FIG. 3. The data fields illustrated in FIG. 4 are illustrative, and any one or more data field may be omitted and/or additional data fields may be included.

Figure 5:
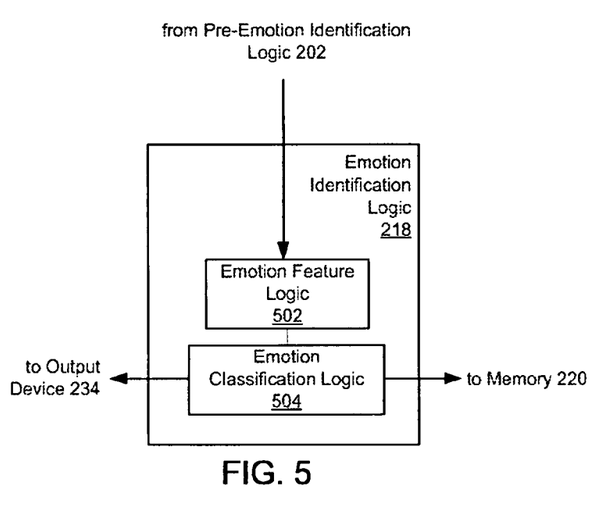
FIG. 5 is a block diagram of an embodiment of emotion identification logic that may be included in the emotion information processing system of FIG. 2, in accordance with various embodiments.

FIG. 5 is a block diagram of an embodiment of the emotion identification logic 218 that may be included in the emotion information processing system 200 of FIG. 2, in accordance with various embodiments. The emotion identification logic 218 may include emotion feature logic 502 and emotion classification logic 504.

The emotion feature logic 502 may be configured to determine at least one emotion feature of an image from the image capture device 224 and/or audio from the audio capture device 226. The emotion feature logic 502 may receive one or more outputs from the data processing logic 202 of FIG. 2, and may output the determined at least one emotion feature to the emotion classification logic 504. Emotion features identified by the emotion feature logic 502 may be "cues" that serve to increase or decrease the probability that a person is experiencing one or more emotions.

In some embodiments, the at least one emotion feature determined by the emotion feature logic 502 may include one or more facial features of a person included in the image. Examples of facial features that may serve as emotion features may include the corners of the eyes, the orientation of the eyebrows, the relative position of the chin, the shape of the mouth (e.g., the positions of the corners of the mouse), the shape of the lips, the relative position of the nose, and the shape of the eyes. In some embodiments, the at least one emotion feature determined by the emotion feature logic 502 may characterize a facial expression. Facial and other features may be identified in an image using known image processing techniques, such as edge detection, Gabor filters, local binary patterns, and other techniques.

In some embodiments, the at least one emotion feature determined by the emotion feature logic 502 may include one or more features of audio data including the voice of the person. Examples of features of audio data that may serve as emotion features include the frequency profile of the voice (e.g., as compared to an average frequency profile), key words spoken by the voice (e.g., "sad," "cry," "terrible"), and non-word sounds (e.g., crying). Additional emotion features may include the output of the context generator logic 216 (e.g., when the person is at a funeral).

The emotion classification logic 504 may be configured to identify an emotional state of a person in an image. In some embodiments, the emotion classification logic 504 may identify the emotional state of the person based at least in part on an emotion feature of an image determined by the emotion feature logic 502. In some embodiments, the emotion classification logic 504 may identify the emotional state of the person based at least in part on an emotion feature of audio data determined by the emotion feature logic 502. In some embodiments, the emotion classification logic 504 may include a classifier trained on data that includes emotion features and the known emotions associated with those features. The emotional states output by the classifier may be selected from a predetermined set of possible emotional states. For example, in some embodiments, the predetermined set of emotional states may include "happy," "sad," "angry," "surprised," "disgusted," "afraid," and "content." Using any one or more known training techniques, the classifier may define a multidimensional space into which the emotion features may be mapped, and the emotional state to be output may depend on the partitioning of this space into different regions associated with different emotional states. Non-limiting examples of training techniques that may be used include support vector machine techniques, Fisher discriminant analysis techniques, and neural network techniques. In some embodiments, a set of emotion features representing a facial expression may be input to the emotion classification logic 504, and an emotional corresponding to the facial expression may be output by the emotion classification logic 504.

In some embodiments, the classifier may use, as an input, an identifier of a person before outputting an emotional state of that person. Thus, the emotion classification logic 504 may be configured to use a different set of classification rules for a particular emotion feature depending on the identity of the person whose emotional state is to be identified. In some embodiments, the emotion classification logic 504 may use a context of the person (e.g., as output by the context generator logic 216) as an input, thereby changing the set of classification rules based on the context. For example, the set of emotions that are most likely when the context is a romantic date are different from the set of emotions that are most likely when the context is a scary movie. A classifier included in the emotion classification logic 504 may be trained to appropriately respond to these different contexts by applying different learned classification rules in these different contexts.

The emotion classification logic 504 may output the identified emotional state to the image output device 222 (or another one or more of the output devices 234) and/or to the memory 220. In some embodiments, outputting the identified emotional state to the memory 220 may include causing the storage of the identified emotional state in combination with other data to enable subsequent response to an emotion-related query provided to the emotion information processing system 200.

Figure 6:
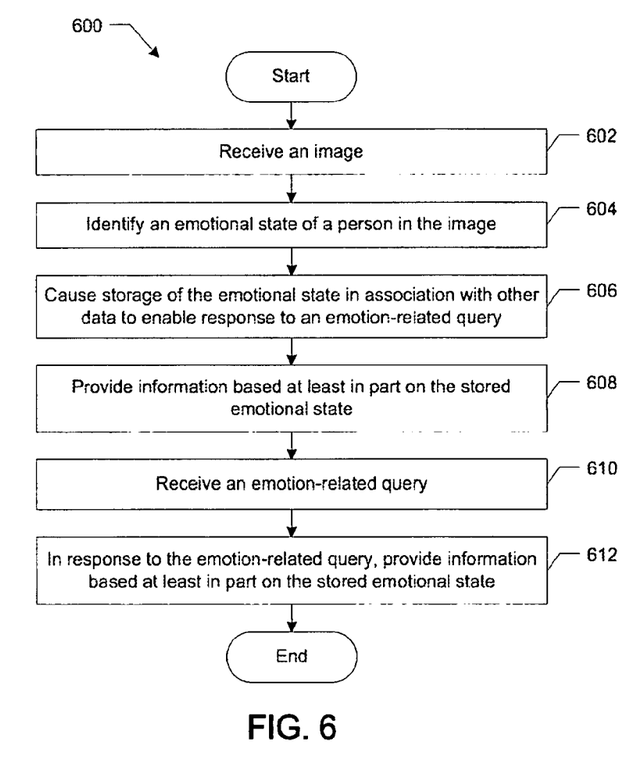
FIG. 6 is a flow diagram of an illustrative process for processing emotion information, in accordance with various embodiments.

FIG. 6 is a flow diagram of an illustrative process 600 for processing emotion information, in accordance with various embodiments. It may be recognized that, while the operations of the process 600 (and the other processes described herein) are arranged in a particular order and illustrated once each, in various embodiments, one or more of the operations may be repeated, omitted or performed out of order. For illustrative purposes, operations of the process 600 may be described as performed by the emotion information processing system 200 (which may be embodied in the computing system 100), but the operations of the process 600, including individual operations of the process 600, may be performed by any suitably configured computing device or collection of computing devices.

Referring now to FIG. 6, the process 600 may begin at the operation 602, in which the emotion information processing system 200 may receive an image. In some embodiments, the image received at the operation 602 may be captured by an image capture device (e.g., the image capture device 224) included in the wearable computing device 102.

At the operation 604, the emotion information processing system 200 may identify an emotional state of a person in the image. The operation 604 may be performed by, for example, a combination of components of the data processing logic 202 and the emotion identification logic 218, or by the emotion identification logic 218 alone. In some embodiments, when the image received at the operation 604 is captured by an image capture device included in the wearable computing device 102, the operation 604 may be performed by a different portion of the computing system 100 (e.g., the handheld computing device 104, the remote computing device 106, or distributed between the two). In some embodiments, the handheld computing device 104 may perform the operation 604, and may receive information about the image wirelessly from the wearable computing device 102. In some embodiments, the remote computing device 106 may perform the operation 604, and may be configured to receive and perform the operation 604 with respect to images captured by a plurality of image capture devices (e.g., included in a plurality of wearable computing devices 102). The operation 604 may be performed in accordance with any of the emotion identification operations discussed above with reference to the data processing logic 202 and the emotion identification logic 218.

In some embodiments, the operation 604 may be performed on a predetermined, regular schedule (e.g., once a day), during which each of a plurality of images captured since the previous performance may be analyzed for emotional state information. For example, in some embodiments, images captured by the image capture device 224 may be uploaded from the handheld computing device 104 to the remote computing device 106 once per day (e.g., at night), and the remote computing device 106 may subsequently analyze each image or a subset of the images. In some embodiments, the operation 604 may be performed as images are captured by the image capture device 224. Such embodiments may be particularly useful when real-time or near real-time feedback of emotional state information is desired (e.g., when assessing the mood of an audience during a performance, or when emotion related information is used to assist a person with cognitive disabilities). The timing of the operation 604 may also depend on the identity of the person in an image; a user may desire prompt information about the emotional state of certain predetermined people, and may be willing to wait to access emotional state information about other people. The operation 604 (and other operations described herein) need not be performed on every image captured by the image capture device 224, but may be performed on a subset of captured images (e.g., every tenth image, or upon significant changes in image content). Additional embodiments of the operation 604 are discussed below with reference to the process 700 of FIG. 7.

At the operation 606, the emotion information processing system 200 may cause the storage of the emotional state of the person (determined at the operation 604). As used herein, any suitable processing device or logic (such as any described herein) may cause storage of data (e.g., by instructing a local or remote memory device or devices to store the data). The emotional state may be stored in combination with other data to enable subsequent response to an emotion-related query provided to the emotion information processing system 200. In some embodiments of the operation 606, the emotional state output by the emotion identification logic 218 may be stored in the memory 220 (with the storage caused by, e.g., the emotion identification logic 218). The operation 606 may include storing the emotional state of the person and the other data in an entry in a database (e.g., a relational database) in any suitable memory structure (e.g., the memory structures 300 and 400 of FIGS. 3 and 4, respectively).

At the operation 608, the emotion information processing system 200 may provide information about the identified emotional state to the output device 234. In some embodiments, the output device 234 may be the image output device 222 and/or the audio output device 232. In some embodiments, the image output device 222 may be located proximal to the image capture device 224; by providing information about the identified emotional state to the image output device 222 at the operation 608, the emotion information processing system 200 may alert a user to emotional states of other people in near real-time. Such embodiments may be particularly useful for users with cognitive disabilities that make recognizing emotions in others difficult. For example, when an image output device 222 (such as a heads-up display) is included in the wearable computing device 102 and the image capture device 224 is located proximal to the image output device 222, the computing system 100 may capture images of people near the wearer, detect the emotional states of people in those images, and provide the detected emotional states on the image output device 222 for the wearer to see.

In some embodiments of the operation 608, the emotion information processing system 200 may provide information about the identified emotional state to an external device or service. For example, the emotion information processing system 200 may provide the image and the identified emotional state to a social networking system, at which the image may be tagged with the identified emotional state and viewable to one or more of the user's contacts or friends in the social networking system. In another example, upon identification of a particular emotional state of a person (e.g., "sad"), the emotion information processing system 200 may be configured to send an electronic message to the person (e.g., via text, e-mail, or through another messaging service). The message may be customized by the user or may be selected from a predetermined list of messages (e.g., "Why are you feeling sad?" or "Cheer up!").

Some or all of the operations 602-608 may be performed repeatedly as new images are received by the emotion information processing system 200 and/or additional persons are identified in images previously received. In some embodiments, the emotion information processing system 200 may identify each of a plurality of persons in a single image, identify the emotional state of each identified person, and cause the storage of the emotional state and other data (such as an identifier of that person). In some embodiments, the emotion information processing system 200 may receive a plurality of images upon repeated iterations of the operation 602, each image including one or more persons, and then may perform suitable ones of the operations 604-608 in processing those images. The operations 604-608 may be performed in any suitable order, and in some embodiments, may be performed in parallel or in overlapping time periods.

At the operation 610, the emotion information processing system 200 may receive an emotion-related query. Emotion-related queries may be provided to the emotion information processing system 200 via the input device 230 (e.g., through the audio capture device 226 or a touchpad or keyboard included in the other input devices 228). In some embodiments, the queries may be natural language queries phrased as a question. A number of examples of such queries are presented herein (e.g., "Was my boss angry with me after the meeting?"). In some embodiments, an emotion-related query may include an emotion-related criteria (e.g., "angry," "sad," "mood") and a non-emotion-related criteria (e.g., a person's name, a location, a time, or an object).

At the operation 612, the emotion information processing system 200 may respond to the emotion-related query (received at the operation 610) by providing information based at least in part on the stored emotional state. The response may be based at least in part on the emotional state in combination with at least some other data (e.g., an identifier of a person, a location, a time, or an object). The operation 612 may be performed by the query processing logic 236, which may use the emotional state information stored in the memory 220. The operation 612 may be performed in accordance with known query processing and search techniques, as discussed above with reference to the query processing logic 236. The process 600 may then end.

Figure 7:
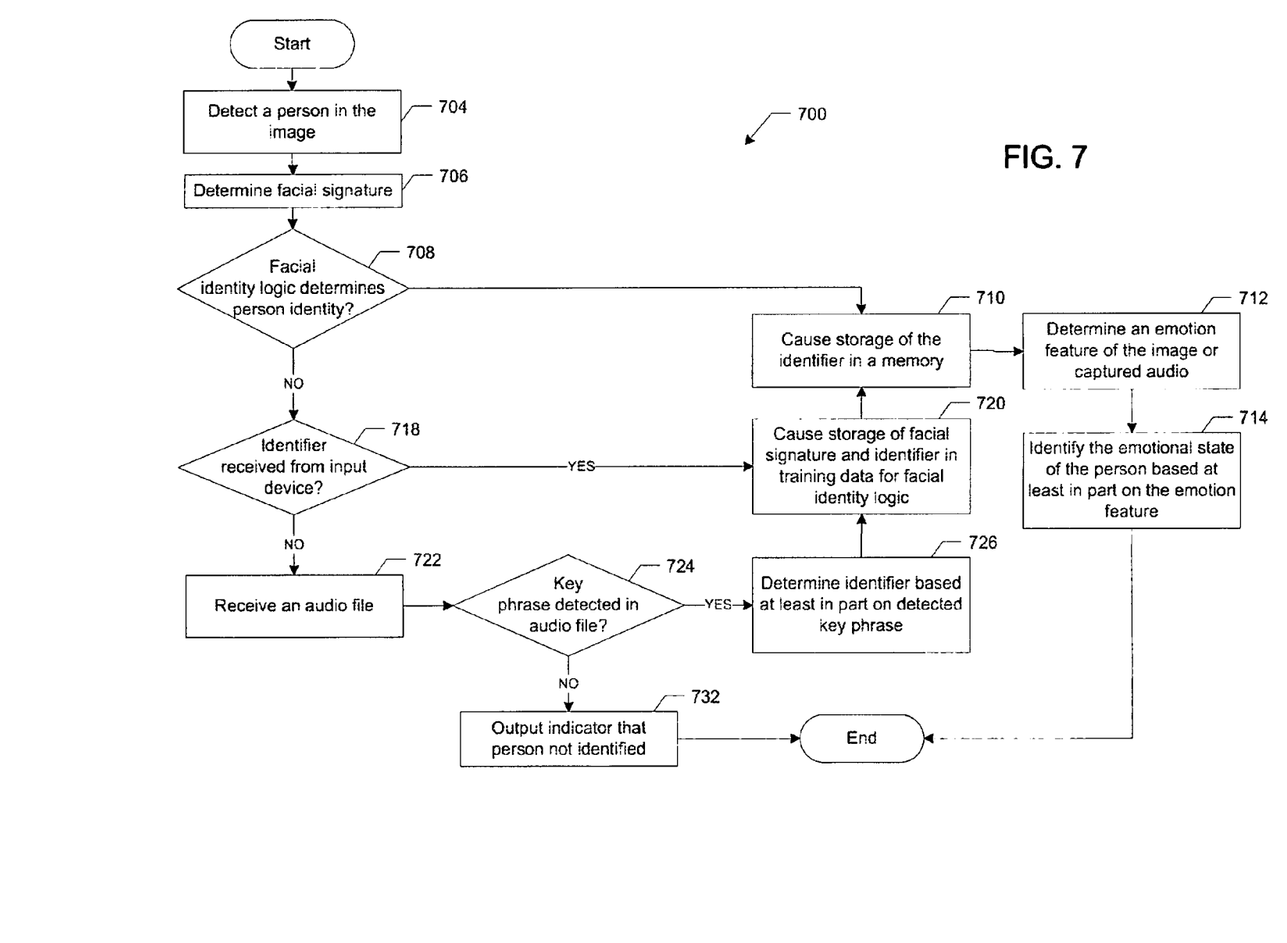
FIG. 7 is a flow diagram of an illustrative process for identifying an emotional state, in accordance with various embodiments.

FIG. 7 is a flow diagram of an illustrative process 700 for determining an emotional state, in accordance with various embodiments. In some embodiments, some or all of the operations of the process 700 may be included in the operation 604 of FIG. 6. As discussed above with reference to FIG. 6, operations of the process 700 may be described as performed by the emotion information processing system 200 (which may be embodied in the computing system 100) for illustrative purposes, but the operations of the process 700, including individual operations of the process 700, may be performed by any suitably configured computing device or collection of computing devices.

The process 700 may begin at the operation 704, in which the emotion information processing system 200 may detect a person in the image. The operation 704 may be performed by the face detection logic 210, and may use any suitable person detection technique (e.g., those described above with reference to the face detection logic 210).

At the operation 706, the emotion information processing system 200 may determine a facial signature of the person detected in the image. The operation 706 may be performed by the face detection logic 210 and/or the facial identity logic 212, and may use any suitable facial signature determination technique (e.g., those discussed above with reference to the face detection logic 210 and the facial identity logic 212).

At the operation 708, the emotion information processing system 200 may determine whether the facial identity logic is able to determine the identity of the person detected at the operation 704. The operation 708 may be performed by the facial identity logic 212. In some embodiments, the facial identity logic 212 may use, as an input, the facial signature determined at the operation 706.

If the emotion information processing system 200 determines that the facial identity logic 212 can identify the person (detected at the operation 704) at the operation 708, the emotion information processing system 200 may proceed to the operation 710 and cause the storage of an identifier of the person (e.g., using the facial identity logic 212). An identifier may be, for example, a name of the person, an identification number for the person (which may be used until the name of the person is known), a title of the person (e.g., "my dentist" or "my boss") or any other identifier that is useful to a user. From the operation 710, the emotion information processing system 200 may proceed to the operation 712 and determine an emotion feature of the image or of captured audio. The operation 712 may be performed by the emotion feature logic 502, and may include any suitable emotion feature logic determination technique (such as those discussed above with reference to the emotion feature logic 502).

At the operation 714, the emotion information processing system 200 may identify the emotional state of the person based at least in part on the emotion feature determined at the operation 712. The operation 714 may be performed by the emotion classification logic 504, and may be performed using any suitable emotion identification technique (such as those described above with reference to the emotion classifier logic 504, and those described above with reference to the operation 604 of the process 600). The process 700 may then end.

Returning to the operation 708, if the emotion information processing system 200 determines that the facial identity logic 212 cannot identify the person (detected at the operation 704), the emotion information processing system 200 may output an indicator that the person could not be identified based on the facial signature (e.g., a visual icon or a "Person Not Identified" message). Such an indicator may be stored in the memory 220 and/or provided to the output device 234. The emotion information processing system 200 may then proceed to perform one or more operations to identify the person using techniques other than identification by the facial identity logic 212.

For example, at the operation 712, the emotion information processing system 200 may determine whether an identifier of the person has been received from the input device 230. In some embodiments, the emotion information processing system 200 may prompt the user to input an identifier (e.g., using the input device 230) prior to the operation 712. For example, the emotion information processing system 200 may cause the image output device 222 to display a list of candidate identifiers (e.g., drawn from the people most recently identified by the emotion information processing system 200, or most often identified in a context generated by the context generator logic 216) and may prompt the user to select the correct candidate identifier or otherwise enter the correct identifier (e.g., from a list of the user's contacts or social network friends, or by manually entering or speaking the correct identifier). In some embodiments, the emotion information processing system 200 may not prompt the user to input an identifier, but may recognize an identifier provided by the user (e.g., when the user says "This is Jim Smith" and the speech is captured by the audio capture device 226 and processed by the voice analyzer logic 204).

If the emotion information processing system 200 determines (at the operation 718) that an identifier of the person has been received from the input device 230, the emotion information processing system 200 may proceed to the operation 720 and cause the storage of the facial signature (determined at the operation 706) and the identifier of the person (received at the operation 718) in a set of data used for training the facial identity logic 212. Training data may be stored in the memory 220 (e.g., in a particular partition or database) or in another memory accessible to the facial identity logic 212. In some embodiments, training data may include multiple sets of associations between facial signatures and identifiers of people known to correspond to those facial signatures.

The training data used by the facial identity logic 212 may be initially populated with manually curated associations (e.g., generated by capturing a set of images of a known person and storing the images in association with an identifier of that person). The facial identity logic 212 may use any known machine learning or other technique to develop rules for distinguishing between facial signatures of different people based on the training data. The performance of the facial identity logic 212 may be improved by adding new training data (via the operation 720) and continuing to refine the facial identity logic 212. In some embodiments, facial signatures successfully identified at the operation 718 may not be stored in the training data.

In some embodiments, upon storing a new facial signature and identifier at the operation 720, the emotion information processing system 200 may instruct the user (e.g., via the output device 234) to keep the image capture device 224 trained on the new face for a fixed or variable period of time so that additional samples of the face may be collected for training purposes. In some embodiments, the facial identity logic 212 (including training logic) may be included in the remote computing device 106. The emotion information processing system 200 may then proceed to the operation 710 and continue as described above with reference to the operations 710-714. The process 700 may then end.

If the emotion information processing system 200 determines (at the operation 718) that an identifier of the person has not been received from the input device 230, the emotion information processing system 200 may proceed to the operation 722 and receive audio data (e.g., from the audio capture device 226). The audio data received at the operation 702 may have been captured (e.g., by the audio capture device 226) in a time period prior to or including a time at which the image (analyzed at the operations 704-708) was captured.

At the operation 724, the emotion information processing system 200 may analyze the audio data to determine whether a key phrase for the person is detected in the audio data. The operation 724 may be performed by the voice analyzer logic 204 and/or the key phrase logic 206, and may be performed using any suitable phrase identification technique (such as those described above with reference to the key phrase logic 206). If the emotion information processing system 200 determines (at the operation 724) that no key phrase for the person is detected in the audio data, the emotion information processing system 200 may proceed to the operation 732 and may store (e.g., in the memory 220) or otherwise output an indication that the person in the image was not successfully identified (e.g., to the output device 234). The process 700 may then end.

The process 700, as illustrated in FIG. 7, optionally includes several advantageous techniques for person identification. One such optional technique is the automatic population of training data for the facial identity logic 212. When the facial identity logic 212 cannot identify a person in an image, but an identifier for that person is received via other means (e.g., from the input device 230 at the operation 718 or via the key phrase process of the operations 722, 724 and 726), the facial signature of that person and the identifier of that person may be stored as new training data for the facial identity logic 212 at the operation 720. Because machine learning techniques may train most efficiently and accurately when the training data represents a wide range of possible inputs, populating the training data with facial signatures that were not successfully identified by the facial identity logic at the operation 708 may improve the performance of the facial identity logic 212 faster and more effectively than if all facial signatures were provided as training data (which may waste training time on facial signatures similar to those already stored in the training data), or if only manually curated facial signatures were provided (which requires the expensive and time-consuming process of manual curation of images under a wide variety of lighting, posture and distance conditions, and thus can only be performed in limited amounts). In some embodiments, the facial identity logic 212 may be trained, using the techniques described herein, to identify a new face in minutes or less.

Another optional advantageous technique represented in the process 700 is the key phrase technique of the operations 722, 724 and 726. By using natural language key phrases provided by speakers during regular conversation to identify people, the key phrase logic 206 may reduce the need for a user to manually input or select an identifier for people not identified by the facial identity logic 212, and may allow more emotional state data to be accurately matched to a person in the memory 220.

In combination, the optional key phrase technique and the automatic population of training data technique may allow the emotion information processing system 200 to more quickly identify and learn the facial signature of new people than conventional techniques. In particular, the key phrase logic 206 may identify a speaker by extracting an identifier from a key phrase (e.g., extracting "John" from "My name is John"), the face detection logic 210 may detect and track a face in an image corresponding to the speaker, and facial signatures derived from many images of the face (e.g., from video provided by the image capture device 224) may be stored along with the identifier in a training data set. The facial identity logic 212 may quickly train on this training data to learn to identify the new face in future images. Although the operation 718 and the operation 722 are illustrated as occurring in series in FIG. 7, these operations may be performed substantially simultaneously so that the emotion information processing system 200 looks for an identifier provided by the input device 230, and seeks a key phrase in audio data captured by the audio capture device 226, in parallel.

Computer readable media (including non-transitory computer readable media), methods, systems and devices for performing the above-described techniques are illustrative examples of embodiments disclosed herein. In some embodiments, such computer readable media may be included in a storage device of any of the computing devices in the computing system 100, as illustrated in FIG. 1. For example, computational logic included in a storage device of any computing device may include assembler instructions supported by a processing device included in the computing device, or may include instructions in a high-level language, such as C, that can be compiled by the processing device. In some embodiments, a permanent copy of the computer readable instructions may be placed into permanent storage in the storage device in the factory or in the field (through, for example, a machine-accessible distribution medium (not shown), such as a compact disc). In some embodiments, a permanent copy of the computer readable instructions may be placed into permanent storage in the storage device through a suitable communication pathway (e.g., from a distribution server).

The following paragraphs provide a number of examples of embodiments of the present disclosure. Example 1 is a method for facilitating emotion-related query, including: receiving, by a computing system, an image of a person; identifying, by the computing system, an emotional state of the person, based at least in part on the image; and causing storage, by the computing system, of the emotional state of the person in combination with other data to enable subsequent response to an emotion-related query provided to the computing system, wherein the emotion-related query includes an emotion-related criteria and a non-emotion-related criteria, and wherein the response is based at least in part on the emotional state in combination with at least some of the other data.

Example 2 may include the subject matter of Example 1, and may further specify that the image is captured by an image capture device included in a wearable computing device different from a portion of the computing system that identifies the emotional state of the person.

Example 3 may include the subject matter of Example 2, and may further specify that the portion of the computing system that identifies the emotional state of the person is a handheld computing device in wireless communication with the wearable computing device.

Example 4 may include the subject matter of any of Examples 1-3, and may further specify that the image is captured by an image capture device and the portion of the computing system that identifies the emotional state of a person is remote from the image capture device and receives captured images from a plurality of image capture devices.

Example 5 may include the subject matter of any of Examples 1-4, and may further specify that identifying an emotional state of the person includes determining an identity of the person.

Example 6 may include the subject matter of Example 5, and may further specify that determining an identity of the person includes: determining a facial signature of the person based on the image; providing the facial signature to facial identity logic, the facial identity logic configured to output, based on the facial signature of the person, an identifier of the person or an indicator that the person could not be identified based on the facial signature; receiving an indicator that the person could not be identified based on the facial signature; receiving an identifier of the person from a source other than the facial identity logic; and in response to receiving the indicator that the person could not be identified based on the facial signature and the identifier, causing the storage of the facial signature of the person, in combination with the identifier, in a set of data used for training the facial identity logic.

Example 7 may include the subject matter of any of Examples 5-6, and may further specify that determining an identity of the person includes: detecting, by the computing system, a key phrase in audio data captured in a time period prior to or including a time at which the image was captured; and determining, by the computing system, an identifier of the person based at least in part on the detected key phrase; wherein the other data stored in combination with the emotional state of the person includes the identifier.

Example 8 may include the subject matter of any of Examples 1-7, and may further specify that the other data includes an identifier of the person, a time at which the image was captured, a location at which the image was captured, or an object identified in the image.

Example 9 may include the subject matter of any of Examples 1-8, and may further specify that the image is a first image and the person is a first person, and may further include: receiving, by the computing system, a second image of the same person or a second person; and identifying, by the computing system, a second emotional state of the same or second person in the image; wherein causing storage includes causing storage of the second emotional state of the same or second person in combination with other data to enable the subsequent response to the emotion-related query, wherein the response is based at least in part the stored first and second emotional states in combination with at least some of the other data.

Example 10 may include the subject matter of Example 9, and may further include: receiving, at the computing system, an emotion-related query; and providing, by the computing system in response to receiving the emotion-related query, information based at least in part on at least one stored emotional state in combination with at least some of the other data.

Example 11 may include the subject matter of any of Examples 1-8, and may further include, in response to identifying the emotional state of the person in the image, providing information about the emotional state, by the computing system, to a display proximal to an image capture device that captured the image.

Example 12 is an apparatus for facilitating emotion-related query, including: an input device interface to receive an image of a person; a memory; and logic coupled to the input device and the memory. The logic is to: identify an emotional state of a person, based at least in part on the image; and cause storage of the emotional state of the person, in the memory, in combination with other data to enable subsequent response to an emotion-related query provided to the computing system, wherein the emotion-related query includes an emotion-related criteria and a non-emotion-related criteria and wherein the response is based at least in part on the emotional state in combination with at least some of the other data.

Example 13 may include the subject matter of Example 12, and may further specify that the image is captured by an image capture device included in a wearable computing device different from the apparatus.

Example 14 may include the subject matter of Example 13, and may further specify that the apparatus is a handheld computing device in wireless communication with the wearable computing device.

Example 15 may include the subject matter of any of Examples 12-14, and may further specify that: the image is captured by an image capture device; the apparatus is remote from the image capture device; and the input device interface is to receive captured images from a plurality of image capture devices.

Example 16 may include the subject matter of any of Examples 12-15, and may further specify that identify an emotional state of a person includes determine an identity of the person.

Example 17 may include the subject matter of Example 16, and may further specify that determine an identity of the person includes: determine a facial signature of the person based on the image; provide the facial signature to facial identity logic, the facial identity logic configured to output, based on the facial signature of the person, an identifier of the person or an indicator that the person could not be identified based on the facial signature; receive an indicator that the person could not be identified based on the facial signature; receive an identifier of the person from a source other than the facial identity logic; and in response to receiving the indicator that the person could not be identified based on the facial signature and the identifier, cause the storage of the facial signature of the person, in combination with the identifier, in a set of data used for training the facial identity logic.

Example 18 may include the subject matter of any of Examples 16-17, and may further specify that determine an identity of the person includes: detect a key phrase in audio data captured in a time period prior to or including a time at which the image was captured; and determine an identifier of the person based at least in part on the detected key phrase; wherein the other data stored in combination with the emotional state of the person includes the identifier.

Example 19 may include the subject matter of any of Examples 12-18, and may further specify that the other data includes an identifier of the person, a time at which the image was captured, a location at which the image was captured, or an object identified in the image.

Example 20 may include the subject matter of any of Examples 12-19, and may further specify that the image is a first image and the person is a first person, and the logic is further to: receive a second image of the same person or a second person; and identify a second emotional state of the same or second person in the image; wherein causing storage includes causing storage of the second emotional state of the same or second person in combination with other data to enable the subsequent response to the emotion-related query, wherein the response is based at least in part the stored first and second emotional states in combination with at least some of the other data.

Example 21 may include the subject matter of Example 20, and may further specify that the input device interface is further to receive an emotion-related query and the logic is further to provide, in response to receiving the emotion-related query, information based at least in part on at least one stored emotional state in combination with at least some of the other data.

Example 22 may include the subject matter of any of Examples 12-21, and may further specify that the logic is further to: in response to identifying the emotional state of the person in the image, provide information about the emotional state to a display proximal to an image capture device that captured the image.

Example 23 is one or more computer readable media having instructions thereon that, when executed by one or more processing devices of a computing device, cause the computing device to perform the method of any of Examples 1-11.

Example 24 is an apparatus including means for performing the method of any of Examples 1-11.

Example 25 is a system including: one or more processing devices; and one or more computer readable media having instructions thereon that, when executed by the one or more processing devices, cause the apparatus to perform the method of any of Examples 1-11.

Example 26 is a method for facilitating emotion-related query, including: receiving an emotion-related query provided to a computing system; retrieving from a memory, with the computing system, data about the emotional state of a person in an image and other data comprising non-emotion-related data about the person in the image; and responding to the emotion-related query using the retrieved emotional state of the person in combination with the other data.

Example 27 may include the subject matter of Example 26, and may further specify that the emotion-related query includes an emotion-related criteria and a non-emotion-related criteria.

Example 28 may include the subject matter of any of Examples 26-27, and may further include identifying, by the computing system, the emotional state of the person based at least in part on the image.

Example 29 may include the subject matter of Example 28, and may further specify that the image is captured by an image capture device included in a wearable computing device different from a portion of the computing system that identifies the emotional state of the person.

Example 30 may include the subject matter of any of Examples 28-29, and may further specify that the portion of the computing system that identifies the emotional state of the person is a handheld computing device in wireless communication with the wearable computing device.

Example 31 may include the subject matter of any of Examples 28-30, and may further specify that the image is captured by an image capture device and the portion of the computing system that identifies the emotional state of a person is remote from the image capture device and receives captured images from a plurality of image capture devices.

Example 32 may include the subject matter of any of Examples 28-31, and may further specify that identifying an emotional state of the person includes determining an identity of the person.

Example 33 may include the subject matter of Example 32, and may further specify that determining an identity of the person includes: determining a facial signature of the person based on the image; providing the facial signature to facial identity logic, the facial identity logic configured to output, based on the facial signature of the person, an identifier of the person or an indicator that the person could not be identified based on the facial signature; receiving an indicator that the person could not be identified based on the facial signature; receiving an identifier of the person from a source other than the facial identity logic; and in response to receiving the indicator that the person could not be identified based on the facial signature and the identifier, causing the storage of the facial signature of the person, in combination with the identifier, in a set of data used for training the facial identity logic.

Example 34 may include the subject matter of any of Examples 32-33, and may further specify that determining an identity of the person includes: detecting, by the computing system, a key phrase in audio data captured in a time period prior to or including a time at which the image was captured; and determining, by the computing system, an identifier of the person based at least in part on the detected key phrase; wherein the other data stored in combination with the emotional state of the person includes the identifier.

Example 35 may include the subject matter of any of Examples 26-34, and may further specify that the other data includes an identifier of the person, a time at which the image was captured, a location at which the image was captured, or an object identified in the image.

Example 36 may include the subject matter of any of Examples 26-35, and may further specify that the image is a first image and the person is a first person, and may further include: receiving, by the computing system, a second image of the same person or a second person; and identifying, by the computing system, a second emotional state of the same or second person in the image; wherein causing storage includes causing storage of the second emotional state of the same or second person in combination with other data to enable the subsequent response to the emotion-related query, wherein the response is based at least in part the stored first and second emotional states in combination with at least some of the other data.

Example 37 may include the subject matter of Example 36, and may further include: receiving, at the computing system, an emotion-related query; and providing, by the computing system in response to receiving the emotion-related query, information based at least in part on at least one stored emotional state in combination with at least some of the other data.

Example 38 may include the subject matter of any of Examples 26-35, and may further include, in response to identifying the emotional state of the person in the image, providing information about the emotional state, by the computing system, to a display proximal to an image capture device that captured the image.

Example 39 is an apparatus for facilitating emotion-related query, including: an input device interface to receive an emotion-related query; a memory; and logic coupled to the input device interface and the memory. The logic is to: receive an emotion-related query via the input device interface; retrieve from the memory, data about the emotional state of a person in an image and other data comprising non-emotion-related data about the person in the image; and respond to the emotion-related query using the retrieved emotional state of the person in combination with the other data.

Example 40 is one or more computer readable media having instructions thereon that, when executed by one or more processing devices of a computing device, cause the computing device to perform the method of any of Examples 26-38.

Example 41 is an apparatus including means for performing the method of any of Examples 26-38.

Example 42 is a system including: one or more processing devices; and one or more computer readable media having instructions thereon that, when executed by the one or more processing devices, cause the apparatus to perform the method of any of Examples 26-38.

Example 43 is a method for facilitating emotion-related query, including: receiving, by a computing system, an image of a person; determining, with the computing system, whether the person in the image can be identified; if the person in the image can be identified, identifying, by the computing system, an emotional state of the person, based at least in part on the image, and causing storage, by the computing system, of the emotional state of the person in combination with other data to enable subsequent response to an emotion-related query provided to the computing system, wherein the emotion-related query includes an emotion-related criteria and a non-emotion-related criteria, and wherein the response is based at least in part on the emotional state in combination with at least some of the other data; if the person in the image cannot be identified, outputting an indicator that the person could not be identified.

Example 44 is an apparatus for facilitating emotion-related query, including: an input device interface to receive an image of a person; a memory; and logic coupled to the input device and the memory. The logic is to: determine whether the person in the image can be identified; if the person in the image can be identified, identify an emotional state of a person, based at least in part on the image, and cause storage of the emotional state of the person, in the memory, in combination with other data to enable subsequent response to an emotion-related query provided to the computing system, wherein the emotion-related query includes an emotion-related criteria and a non-emotion-related criteria and wherein the response is based at least in part on the emotional state in combination with at least some of the other data; if the person in the image cannot be identified, output an indicator that the person could not be identified.

Example 45 is one or more computer readable media having instructions thereon that, when executed by one or more processing devices of a computing device, cause the computing device to perform the method of Example 43.

Example 46 is an apparatus including means for performing the method of Example 43.

Example 47 is a system including: one or more processing devices; and one or more computer readable media having instructions thereon that, when executed by the one or more processing devices, cause the apparatus to perform the method of Example 43.

What is claimed is:

1. An apparatus for facilitating emotion-related query, comprising:
   an input device interface to receive an image of a person;
   a memory; and
   logic, coupled to the input device interface and the memory, wherein the logic is to:

identify an identity of the person and a context associated with the image, based at least in part on the image, wherein the context associated with the image is based in part on an environment in which the image was captured, wherein the logic is to identify the context based on one or more non-human objects identified in the image, and at least one of one or more sounds in audio data obtained by the input device interface or one or more measurements in sensor data obtained by the input device interface;

determine an emotional state of the person based on one or more facial features of the person and the context;

cause storage of the identity of the person, the emotional state of the person, and the context, in the memory, in combination with other data wherein the other data includes data associating the person, the context, and the emotional state of the person; and provide, in response to an emotion-related query, information based at least in part on the stored emotional state in combination with at least some of the other data, wherein the emotion-related query comprises an emotion-related criteria and a non-emotion-related criteria, wherein the non-emotion related criteria includes association of the person with the emotion-related criteria to be searched in response to the emotion-related query.

2. The apparatus of claim 1, wherein the image is captured by an image capture device included in a wearable computing device that is a different device than the apparatus, wherein the image capture device faces away from a user of the wearable computing device.

3. The apparatus of claim 2, wherein the apparatus is a handheld computing device in wireless communication with the wearable computing device.

4. The apparatus of claim 1, wherein:
the image is captured by an image capture device;
the apparatus is remote from the image capture device; and
the input device interface is to receive captured images from a plurality of image capture devices.

5. The apparatus of claim 1, wherein determine an emotional state of the person comprises determine the identity of the person.

6. The apparatus of claim 5, wherein determine the identity of the person comprises:
determine a facial signature of the person based on the image;
provide the facial signature to facial identity logic, the facial identity logic configured to output, based on the facial signature of the person, an identifier of the person or an indicator that the person could not be identified based on the facial signature;
receive an indicator that the person could not be identified based on the facial signature;
receive an identifier of the person from a source other than the facial identity logic; and
in response to receiving the indicator that the person could not be identified based on the facial signature and the identifier, cause the storage of the facial signature of the person, in combination with the identifier, in a set of data used for training the facial identity logic.

7. The apparatus of claim 5, wherein determine the identity of the person comprises:

detect a key phrase in audio data captured in a time period prior to or including a time at which the image was captured; and
determine an identifier of the person based at least in part on the detected key phrase;
wherein the other data stored in combination with the emotional state of the person comprises the identifier.

8. The apparatus of claim 1, wherein the other data comprises an identifier of the person, a time at which the image was captured, a location at which the image was captured, or an object identified in the image.

9. The apparatus of claim 1, wherein the image is a first image and the person is a first person, and wherein the logic is further to:
receive a second image of the same person or a second person; and
determine a second emotional state of the same or second person in the image;
wherein causing storage comprises causing storage of the second emotional state of the same or second person in combination with other data, wherein the information to be provided in response to the emotion-related query is further based at least in part on the stored first and second emotional states in combination with at least some of the other data.

10. The apparatus of claim 9, wherein the information is further based at least in part on at least one previously stored emotional state associated with the person in combination with at least some of the other data.

11. The apparatus of claim 1, wherein the logic is further to:
in response to determine the emotional state of the person in the image, provide information about the emotional state to a display communicatively coupled with an image capture device that captured the image.

12. One or more non-transitory computer readable media having instructions thereon that, when executed by one or more processing devices of a computing system, cause the computing system to:
receive an image of a person;
identify an identity of the person and a context associated with the image, based at least in part on the image, wherein the context associated with the image is based in part on an environment in which the image was captured;
identify the context based on one or more non-human objects identified in the image, and at least one of one or more sounds in audio data obtained by an input device interface or one or more measurements in sensor data obtained by the input device interface;
determine an emotional state of the person based on one or more facial features of the person and the context;
cause storage of the emotional state of the person, the identity of the person, and the context in combination with other data; and
provide, in response to an emotion-related query, information based at least in part on the stored emotional state in combination with at least some of the other data, wherein the emotion-related query comprises an emotion-related criteria and a non-emotion-related criteria, wherein the non-emotion related criteria includes association of the person with the emotion-related criteria to be searched in response to the emotion-related query.

13. The one or more non-transitory computer readable media of claim 12, wherein the image is captured by an image capture device included in a wearable computing device that is different from a portion of the computing system that determines the emotional state of the person, wherein the image capture device faces away from a user of the wearable computing device.

14. The one or more non-transitory computer readable media of claim 13, wherein the portion of the computing system that determines the emotional state of the person is a handheld computing device in wireless communication with the wearable computing device.

15. The one or more non-transitory computer readable media of claim 12, wherein the image is captured by an image capture device and a portion of the computing system that determines the emotional state of a person is remote from the image capture device and receives captured images from a plurality of image capture devices.

16. The one or more non-transitory computer readable media of claim 12, wherein determine the emotional state of the person comprises determining an identity of the person.

17. The one or more non-transitory computer readable media of claim 16, wherein determine the identity of the person comprises:
   determine a facial signature of the person based on the image;
   provide the facial signature to facial identity logic, the facial identity logic configured to output, based on the facial signature of the person, an identifier of the person or an indicator that the person could not be identified based on the facial signature;
   receive an indicator that the person could not be identified based on the facial signature;
   receive an identifier of the person from a source other than the facial identity logic; and
   in response to receiving the indicator that the person could not be identified based on the facial signature and the identifier, cause the storage of the facial signature of the person, in combination with the identifier, in a set of data used for training the facial identity logic.

18. The one or more non-transitory computer readable media of claim 16, wherein determine the identity of the person comprises:
   detect a key phrase in audio data captured in a time period prior to or including a time at which the image was captured; and
   determine an identifier of the person based at least in part on the detected key phrase;
   wherein the other data stored in combination with the emotional state of the person comprises the identifier.

19. The one or more non-transitory computer readable media of claim 12, wherein the other data comprises an identifier of the person, a time at which the image was captured, a location at which the image was captured, or an object identified in the image.

20. The one or more non-transitory computer readable media of claim 12, wherein the image is a first image and the person is a first person, and wherein the one or more computer readable media has instructions thereon that, when executed by the one or more processing devices of the computing system, cause the computing system to:
   receive a second image of the same person or a second person; and
   determine a second emotional state of the same or second person in the image;
   wherein cause storage comprises cause storage of the second emotional state of the same or second person in combination with other data, wherein the information to be provided in response to the emotion-related query is further based at least in part on the stored first and second emotional states in combination with at least some of the other data.

21. The one or more non-transitory computer readable media of claim 20, wherein the one or more computer readable media has instructions thereon that, when executed by the one or more processing devices of the computing system, cause the computing system to:
   receive the emotion-related query, and
   wherein the information to be provided in response to the emotion-related query is further based at least in part on at least one previously stored emotional state associated with the person in combination with at least some of the other data.

22. The one or more non-transitory computer readable media of claim 12, wherein the one or more computer readable media has instructions thereon that, when executed by the one or more processing devices of the computing system, cause the computing system to:
   in response to determine the emotional state of the person in the image, provide information about the emotional state to a display communicatively coupled with an image capture device that captured the image.

23. The apparatus of claim 1, wherein the emotion-related query is based on aggregate emotion-related information from one or more persons stored in the memory, and wherein the aggregate emotion-related information is to be provided in response to an emotion-related query according to the non-emotion-related criteria.

* * * * *